Aug. 29, 1939.  J. E. CHRISTIAN  2,171,394
DEVICE FOR CONTROLLING AND REGULATING LIQUID LEVEL, LIQUID FLOW,
AND TEMPERATURE AND PRESSURE CONDITIONS THEREOF
Filed Jan. 30, 1935  3 Sheets-Sheet 1
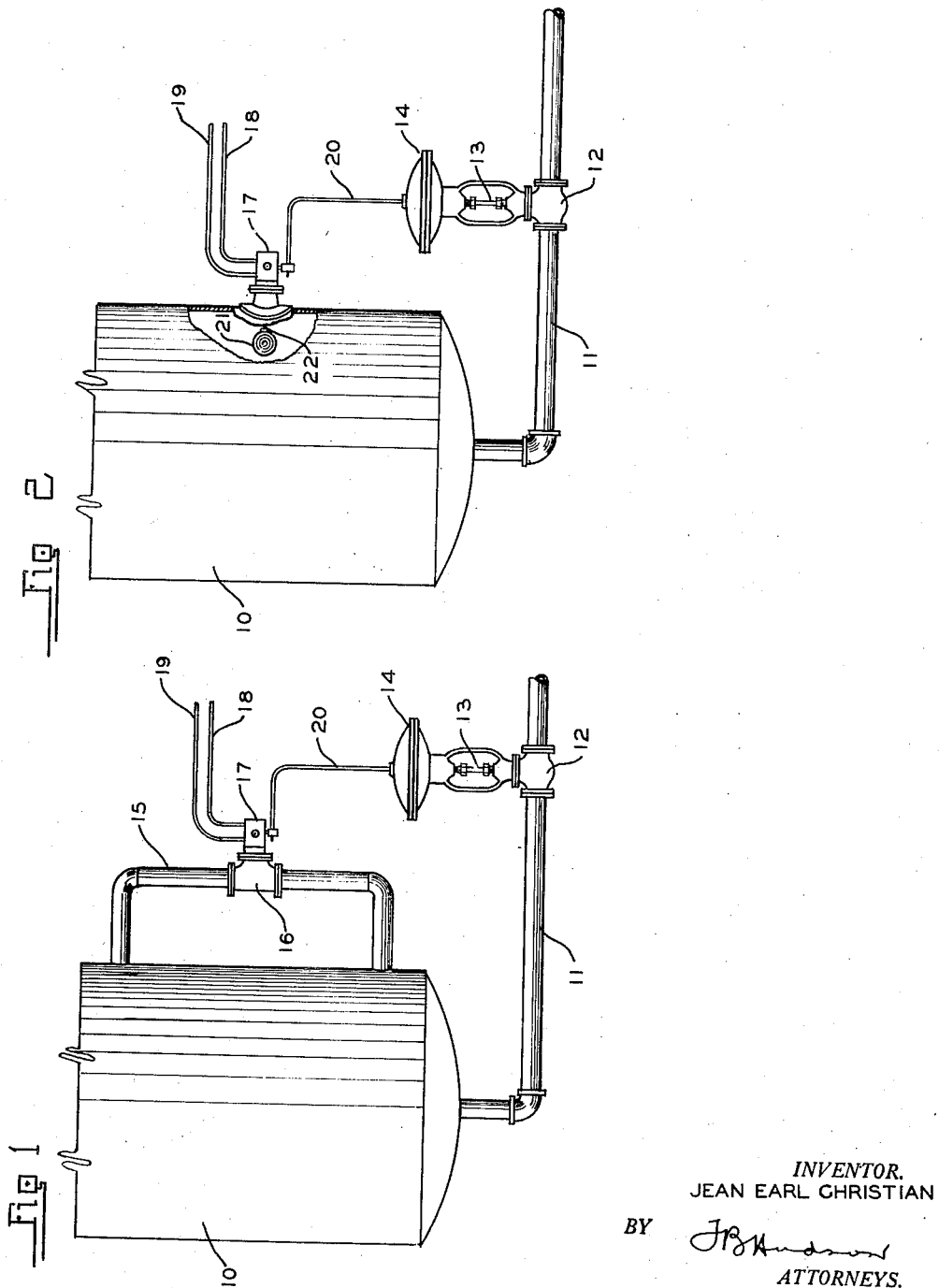
INVENTOR.
JEAN EARL CHRISTIAN
BY
ATTORNEYS.

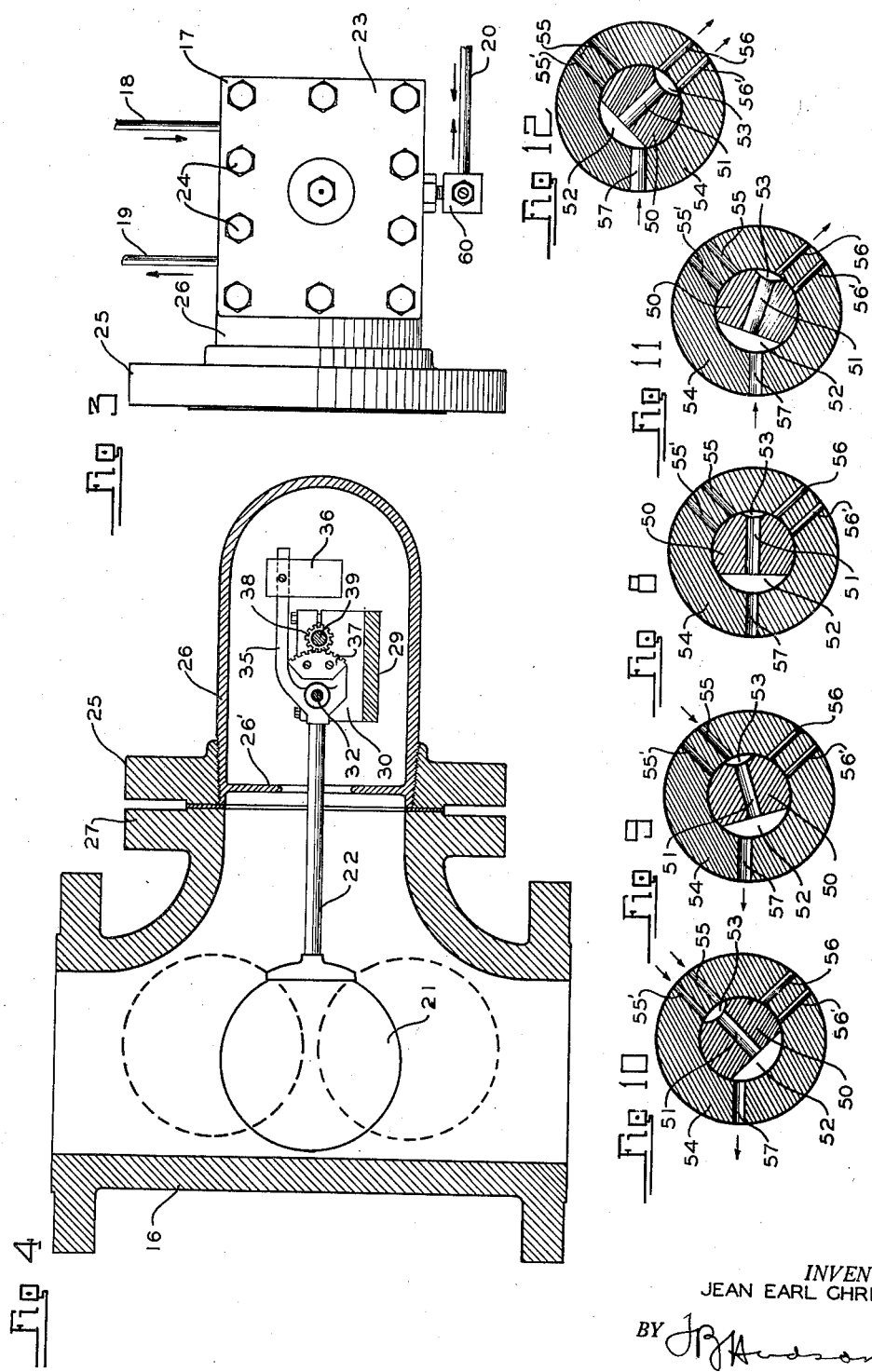

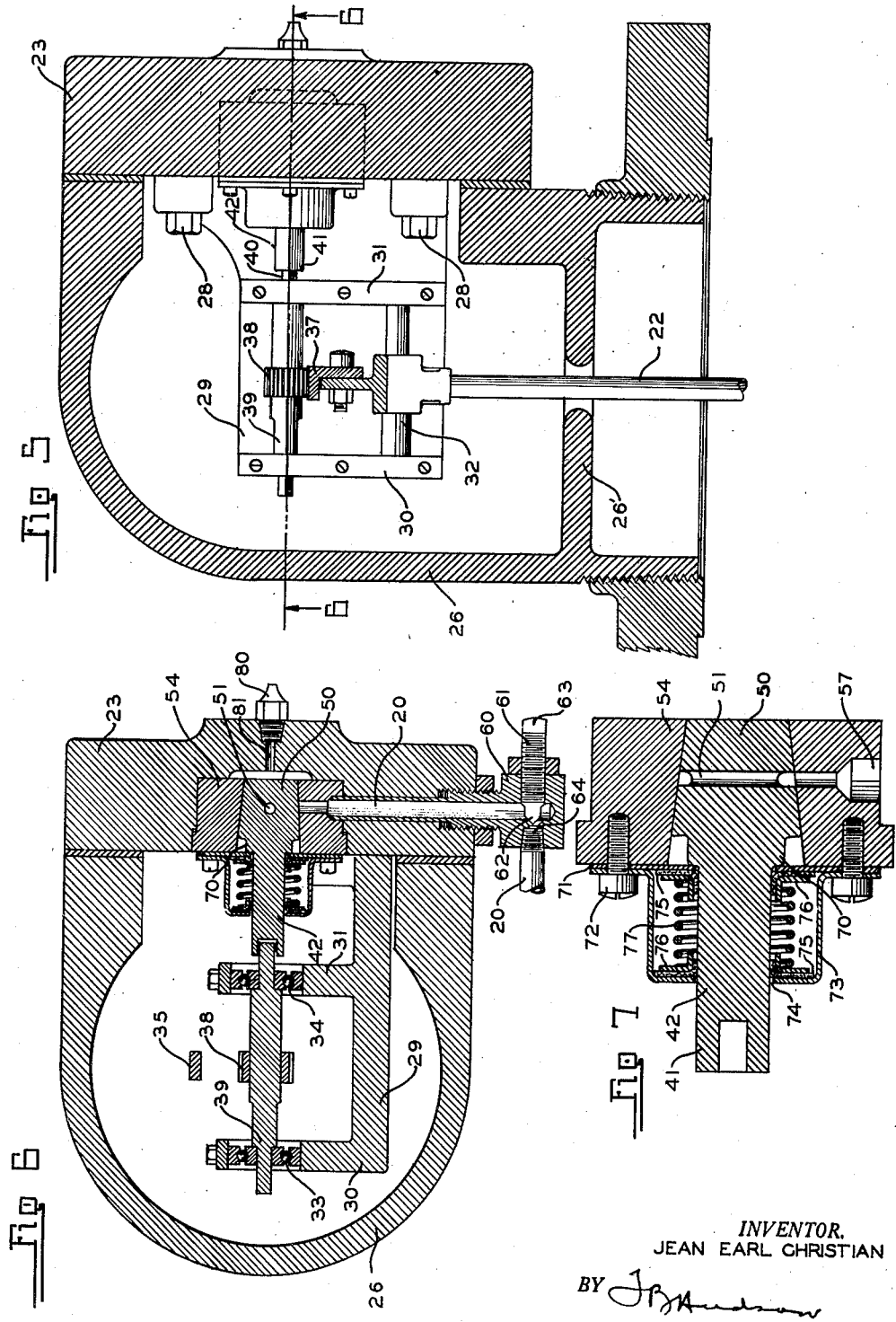

Patented Aug. 29, 1939

2,171,394

UNITED STATES PATENT OFFICE 2,171,394

DEVICE FOR CONTROLLING AND REGULATING LIQUID LEVEL, LIQUID FLOW, AND TEMPERATURE AND PRESSURE CONDITIONS THEREOF

Jean Earl Christian, Bartlesville, Okla., assignor to Phillips Petroleum Company, Bartlesville, Okla., a corporation of Delaware Application January 30, 1935, Serial No. 4,198

1 Claim. (Cl. 137—104)

This invention relates to an improved apparatus for controlling and regulating liquid levels, pressure, temperature, rate of flow and time cycles, and relates especially to such a control and regulation device wherein the level or other controlled factor is dependent upon and controlled by a main valve or an electrical switch, etc., and in particular it relates to an improved automatic type of pilot valve for controlling the main valve, switch, or their equivalents, and to improved means for actuating the pilot valve.

The broad object of this invention is to provide an improved means for maintaining a desired liquid level pressure, or other conditions within a tank or other container; and more specifically its object is to provide an improved means in the form of a pilot valve for controlling and actuating a main valve, electrical switch, or their equivalents, the conditions of which vary and regulate the liquid level or other controlled factor.

An object of this invention is to provide an efficient self-acting pilot valve for automatically controlling a liquid level or other condition, and which will actuate a main valve or switch, or the like, by virtue of varying conditions within the container dependent upon changes of level, pressure, flow, temperature, and such.

Another object of this invention is to provide a pilot valve for actuating a main valve, switch, or their equivalents, which will control liquid level or other conditions in a system or vessel through the medium of fluid pressure, and which will operate the same smoothly and positively without impact or vibration, at any desired rate of speed and which will correct minute changes in the liquid level or other factor to be controlled, should it vary.

Still another object of this invention is to provide a fluid actuated main valve to maintain the liquid level or other controlled factor of a container constant, and to provide an automatic pilot valve operable upon changes within or without the container, to permit controlled applications of fluid to actuate the main valve.

Additional objects of this invention reside in providing an improved type of automatically controlled pilot valve for actuating and controlling a main valve used in maintaining a constant controlled condition in a container, which is light in weight, compact in size, eliminates expensive and faulty stuffing boxes, complicated arrangements of links and levers, and which is equally efficient and positive of operation in handling both light and heavy liquids.

One embodiment of my invention for effecting the above objects and advantages in an apparatus for maintaining constant conditions in a container is described in the following specification and illustrated by the drawings forming a part thereof, wherein, Fig. 1 represents an embodiment of the present invention, illustrating a liquid container or tank, a conduit for carrying liquid thereto, a main valve in said conduit for controlling the flow of liquid to the tank, and a liquid column parallel with and connected to the tank for actuating a pilot valve which will control and actuate the main valve, Fig. 2 represents a modification of the embodiment illustrated in Fig. 1, and shows the pilot valve controlled by means extending directly into the tank and actuated by the liquid level therein, Fig. 3 is an enlarged side view of one embodiment of the pilot valve casing showing the cover plate fluid connections and fittings, Fig. 4 is an enlarged side view of one embodiment of the pilot valve actuating mechanism showing in section the housing therefor, and the liquid column, Fig. 5 is an enlarged top view of one embodiment of the pilot valve and actuating means therefor showing in cross-section the casing and side cover plate therefor, Fig. 6 is a cross-sectional view of Fig. 5 taken on line 6—6 looking in the direction of the arrows, and shows one embodiment of the pilot valve, and a portion of the actuating means therefor, Fig. 7 is an enlarged detailed view of the pilot valve shown in Fig. 6, taken along the longitudinal axis of the valve plug, and showing one of the conduits thereof in communication with a conduit of the valve seat, Fig. 8 is a detailed view of one embodiment of the pilot valve, including valve plug and seat, illustrating the same in transverse cross section and showing the several intake and exhaust ports, the single port to the main valve, and the ports in the valve plug which are shown in a neutral position, Fig. 9 is a view of the valve plug and seat similar to that shown in Fig. 8, but shows the valve plug rotated to bring one inlet port in communication with the port to the main valve, Fig. 10 is a view of the valve plug and seat similar to that shown in Fig. 8, but shows the valve plug rotated to bring both inlet ports in communication with the port to the main valve, Fig. 11 is a view of the valve plug and seat similar to that in Fig. 8, but with the valve plug rotated to bring one exhaust port in communication with the port to the main valve.

Fig. 12 is a view of the valve plug and seat similar to that in Fig. 8, but with the valve plug rotated to bring both exhaust ports in communication with the port to the main valve.

With reference to the above described drawings illustrating one embodiment of my invention there is shown in Fig. 1 a tank or other liquid container 10 of any desired and convenient size, shape and capacity, and wherein it is desired to maintain a constant level for use in and in connection with the efficient operation of certain other apparatus and systems not necessary to be here described. It will be obvious that liquid may be fed into the tank from the top by gravity or pressure, or at any other convenient point, and that the liquid may be withdrawn from the tank in any desired manner, but in the present embodiment it has been elected to supply liquid to the tank from the bottom by means of a pipe 11. The pipe 11 might serve the purpose of either an inlet or an outlet, but will be hereinafter described and referred to only as an inlet. A fluid operated main valve 12, having a valve stem 13 connected to one side of a diaphragm housed in the casing 14 is provided to control the admission of the liquid to the tank.

No outlet for the tank 10 other than the possible function of pipe 11 is described or shown, but the variation in level may be caused by any of several causes, such as a separate pipe or conduit through which a variable amount of liquid is drawn off, or by evaporation, distillation, or by any other means whereby the loss of liquid from the vessel is variable, necessitating a variable supply if a liquid level is to be maintained at a constant.

The main valve 12 is not independent in operation, but is dependent upon, and operated by, a pilot valve which controls the fluid pressure which actuates the main valve. The pilot valve is in turn affected by and actuated by the liquid level in the tank. As the liquid level varies or surges in either direction the pilot valve is actuated, whereby it in turn opens and closes the main valve, allowing for the admission of liquid through pipe 11 to maintain a predetermined constant level in tank 10. It has been found that one manner of assuring this condition resides in providing a liquid column 15 in association with the tank so that the liquid therein may flow freely through the column, resulting in the liquid level in the tank and column being the same. In this column there is provided a coupling 16 shown here in the form of a T which constitutes a housing for part of the means for actuating a pilot valve encased in the housing 17, and which operates and controls the medium for actuating the main valve 12.

The main valve 12 may be actuated by means of any fluid under pressure, but it has been found advantageous to utilize gas or air. The pressure is controlled by the pilot valve, which is in turn controlled by the liquid level in the tank and column, to act upon one side of the diaphragm within the casing 14 and by moving the same to actuate the main valve stem 13 connected thereto. To effect this there is shown a fluid inlet conduit 18 connected to a suitable source of pressure, and an exhaust conduit 19, both connecting with the casing 17 and controlled by the pilot valve therein. A conduit 20 connects one side of the diaphragm 14 with the conduits 18 and 19, and as they are controlled by the pilot valve, changes in the level will cause various conditions within conduit 20 to act on the diaphragm, within the casing 14, thus causing the main valve 12 to be actuated.

While the use of diaphragm operated valves is so general that no detailed explanation of their construction seems necessary, it may be well to briefly describe a valve of this type.

This type of valve consists of a set of valve seats, a valve, and a valve stem which is connected to a diaphragm. A spring is usually provided working against the pressure on the diaphragm to provide force in the opposite direction. In this manner when the spring closes the valve, the pressure on the diaphragm opens the valve and vice versa.

The liquid column 15 shown in Fig. 1 for reproducing therein the approximate liquid level condition as that in the tank 10 and thereby actuating the pilot valve housed in the casing 17 may be dispensed with in certain embodiments of this invention, for instance such as the one illustrated in Fig. 2. In this instance the pilot valve casing 17 is mounted adjacent the tank 10, and there is provided a ball float 21 on the end of an arm 22 which serves to actuate the pilot valve in direct accordance with the level condition within the tank.

From the brief description of the present invention thus far given it will be appreciated that a constant level may be maintained within a tank, and that any variations in the level will result in initiating apparatus to correct the level to that desired. In the embodiment of this invention just described there has been utilized a float element directly affected by the liquid level changes to control pilot and main valves.

This invention is not to be restricted solely to mechanisms for maintaining a constant liquid level, but the same may be used to control pressure, fluid flow, temperature conditions, time cycles, remote controls, or any similar operation.

Under certain circumstances it might be desirable to rely upon time controlled mechanisms to maintain a level, pressure, or temperature constant within the tank. In such instance a spring or an electrically driven clock, or an equivalent thereof, could be used to operate the pilot valve at predetermined intervals.

However, the invention will be further described illustrating in detail the preferred embodiment, and wherein there is utilized a float affected by the varying level conditions within the tank, to actuate a pilot valve to control a main valve which controls the entry of liquid to the tank to maintain a constant liquid level, and which in this embodiment is actuated by a fluid such as air or gas under pressure. It is to be understood that any of the above described methods and apparatus or their equivalents may be used to actuate the pilot valve without departing from the spirit and scope of this present invention.

In Fig. 3 there is illustrated an enlarged view of the pilot valve casing generally designated by the reference numeral 17, and including a cover plate 23, later to be referred to, together with suitable bolts 24 for retaining the plate in place on the housing. The housing 17 has associated therewith a flange coupling 25 with which the pilot valve housing proper shown at 26 has a threaded connection. The flange 25 is utilized as shown in Fig. 4 to connect the pilot valve casing with the T fitting 16, by its association with the complementary flange coupling 27.

Mounted upon the inner face of the pilot valve housing cover plate by means of suitable bolts 28 there is provided a stage or bracket 29 disposed in a horizontal plane, and provided with spaced bearing supports 30 and 31. Float arm 22 is mounted to pivot around a shaft 32 which is mounted at either end in ball-bearings 33 and 34. The float arm continues past the shaft 32 and terminates in a yoke arm 35 upon which is mounted an adjustable counterweight 36. Connected to the yoke arm 35 is a segmental gear 37 which meshes with a toothed pinion 38 mounted on shaft 39, and which is mounted in bearings in the supports 30 and 31 respectively. It will be appreciated that as the float 21 is moved up and down due to changes of the liquid level that the float arm pivoted about the shaft 32 will cause the segmental gear 37 through the pinion 38 to impart a rotary motion to shaft 39. This shaft has a square end 40 fitting into a socket 41 in the stem 42 of the valve plug, and so rotates the same.

The force applied on the float caused by changes in the liquid level is, in the embodiment just described, utilized to actuate the valve plug extension by transmitting the force developed through a gear and pinion, but it should be understood that it is within the scope of this present invention to provide any equivalents therefor such as a suitable arrangement of links and levers.

The pilot valve is located in a recessed portion 43 of the cover plate 23, and will be described later.

It should be appreciated that the pilot valve housing has located therein an internal baffle plate 26' having an opening therein of relatively small size, through which the float arm passes. While ordinarily the materials used will be such as to withstand any temperature or corrosive conditions encountered, this baffle wall creates a relatively dead area in which the pilot valve gears operate. The absence of currents in this area materially reduces the flow of heat or corrosive vapors around the pilot valve gears resulting in a better operating condition which makes the use of such gears practical even when high temperatures or corrosive conditions are encountered.

In some instances conditions might be such that a greater force is required to operate the pilot valve, or that the liquid level apparatus is operating in a relatively light liquid. In such instances it is only necessary to extend the length of the pilot valve housing by connecting an extension or spool thereto between this port and the T fitting, and extending the length of the float arm to obtain additional leverage. It should be noted that changing the length of this float arm need not effect the speed at which the main valve operates, as this factor is adjustable, as will be later described.

The main valve 12 for controlling the influx of liquid to the tank 10 is opened or closed, depending on the type valve used, by fluid from any suitable source not shown, and the application of which to the main valve is controlled by a pilot valve. The fluid pressure enters the pilot valve through a conduit 18, and if the pilot valve is in such a position as to permit it to pass, it will enter a conduit 20 to act on a diaphragm, within the casing 14, to which the stem of the main valve is connected and so actuates the same. Conduit 19 is an exhaust line for the fluid to bleed off of the diaphragm through the conduit 20 and the exhaust ports in the pilot valve.

The mechanism used to control the fluid pressure for actuating the main valve consists of a valve plug 50, having a bore or port 51 passing transversely through the axis thereof, and having a relatively large longitudinal arcuate section removed to form a port 52, and a relatively small longitudinal eliptical section removed to constitute a port 53. The valve plug 50 has a steam or extension 42 connected thereto and extending longitudinally thereof into the gear housing where it makes connection at 40 with shaft 39. It will thus be seen that the valve plug, together with the conduit and ports therein, may be caused to rotate due to changes in the liquid level. The valve plug rotates within a valve seat 54 which is stationarily mounted within the recess 43 of the pilot valve casing cover plate 23. The valve seat is provided with various ports connecting with the fluid pressure supply 18, and the exhaust conduit 19, and the control conduit 20 which leads to the main valve. In order to accommodate various rates of flow through these ports and conduits to actuate the main control valve with different and controlled degrees of speed, it has been found advantageous to have several valve ports.

This arrangement not only controls the rate of flow to and from the valve diaphragm, but also allows a small volume to pass in either direction with small changes in the liquid level, or other factor to be controlled, and in the event the first setting of the pilot valve will not correct the conditions, then additional ports come into play with a corresponding increase in the volumes handled.

This arrangement permits a floating action of the main valve as additional ports are ordinarily not in use after the correct level is obtained, one port being enough to trim the main valve setting, the additional ports coming into play only when surges or similar conditions occur in the equipment.

To this extent it has been found beneficial to provide a plurality of ports in the pilot valve which may connect singly or in combination with the pressure inlet and exhaust conduits. Referring to Figs. 8, 9, 10, 11, and 12, the valve seat 54 is illustrated, including ports 55 and 55' which may connect directly with the pressure supply conduit 18, and including ports 56 and 56', which may connect with the pressure exhaust conduit 19. The port 57 within the pilot valve seat is provided to communicate with conduit 20 leading to the diaphragm 14 which actuates the main valve 12.

Assuming that the level of the liquid within the tank 10 is at the proper and desired level, then the pilot valve will be in a neutral position. The float will be in the position shown in full lines in Fig. 4, and the pilot valve and ports will be associated as shown in Fig. 8, which is a neutral position with no pressure entering ports 55 and 55' from the pressure supply 18, and no pressure leaving the exhaust conduit 19 by way of ports 56 and 56'. Consequently no pressure changes are made in conduit 20 leading to the diaphragm which controls the main valve, as port 57 leading thereto is not in communication with the inlet or exhaust conduits, and the pressure within conduit 20 and upon the main valve actuating diaphragm remains constant, allowing the main valve to remain in such a position as to maintain the liquid at the desired level.

Variances in pressure upon the diaphragm are utilized to actuate the main valve, and the application of increased pressure may be used to open the valve, or the reduction of pressure may be used. Such details of operation do not effect the scope of this invention. However, in the present embodiment of this invention the action of the main valve will be described as being dependent upon the application of pressure to open the same.

If for any of several reasons the liquid level in tank 10 should drop, there will in such instance be a downward movement imparted to the float 21 resulting in the gear 37 imparting a slight clockwise rotary movement to pinion 38 and shaft 39 which through the connection 40 will partially rotate the valve plug 50. If the drop in the liquid level is only slight the valve plug will be rotated through only a few degrees and result in positioning the valve plug with relation to the seat as shown in Fig. 9, thereby connecting the ports 51, 52 and 53 of the valve plug and port 57 leading to the main valve with one of the valve seat ports, namely 55, communicating with the pressure inlet conduit 18. In this manner pressure in conduit 20 is increased and acts upon the diaphragm within the casing 14 to open the main valve allowing liquid to enter the tank to maintain the desired level. If the level continues to drop, then the float will move downward through a greater path, resulting in a greater rotation being given to the pilot valve plug 50, causing both ports 55 and 55′ to be in communication through the pilot valve plug and seat ports and with the conduit 20 leading to the main valve as shown in Fig. 10, thus more rapidly actuating the main valve 12 through the increased flow of air or other fluid to the diaphragm 14.

In either of the above instances upon the re-establishment of the desired liquid level within the tank 10 the float 21 will be affected to initiate the action of the pilot valve to return the same to the neutral position of that shown in Fig. 8 and maintain the desired liquid level in the tank.

Should the level in the tank 10 rise slightly above the desired level the float will rise also and through the arm 22 and gear 27 impart a partial rotary motion movement in a counter-clockwise direction to the pinion 38 and shaft 39, resulting in the pilot valve stem being turned to cause the various ports to be positioned with respect to the several conduits as shown in Fig. 11. In such position the pressure upon the main valve actuating diaphragm is released through conduit 20, valve seat ports 57 and 56, valve plug ports 52, 51 and 53, and exhaust conduit 19, allowing the main valve 12 to close slowly effecting a re-establishment of the desired level within the tank.

Then should the liquid level within the tank continue to rise, the float will move upwardly a greater distance resulting in a greater rotation being given to the pilot valve plug in a counter-clockwise direction to such an extent that the pilot valve ports and the several conduits will be associated as shown in Fig. 12, in which instance both ports 56 and 56′ are in communication with conduit 20 and exhaust conduit 19, permitting a rapid reduction of pressure upon the main valve actuating diaphragm with the resultant rapid closing of the main valve.

In either of the above instances where the liquid level is too high and the float through the pilot valve acts upon the main flow control valve to correct the level, the level as soon as corrected brings all parts of the liquid level controlling device to rest at a neutral position with the pilot valve in the position shown in Fig. 8. Upon any further fluctuations or surges of the level in the tank 10 the float will rise or fall and actuate the pilot valve to continuously control the pressure on the diaphragm for actuating the main valve and so correct any undesirable level conditions and maintain the level at the desired elevation.

Under some circumstances it may be desirable to have a further means of controlling and regulating the pressure which acts on the diaphragm to actuate the main valve and to this extent there is located in the conduit 20 between the main and pilot valves a fitting 60, which is shown as having a screw threaded connection with the casing cover plate 17 and as interposed between the conduit sections 20 and 20′. A pin 61 has a screw threaded connection in a wall of the fitting 60, and has its internal end tapered to substantially present a conical shaped head 62. The exterior end of the pin 61 is provided with a tool engaging surface 63. By adjusted retraction and projection of the pin 61 the head 62 will control the size of orifice 64 in the conduit 20 and so regulate the rate of flow through conduit 20 to further control the action or speed of the main control valve in maintaining a constant liquid level.

To hold the pilot valve plug in operable position the same is formed with a shoulder 70 bearing against a retaining plate 71 secured by bolts 72 to the valve seat. To further retain the pilot valve plug in position there may be provided a collar 73 likewise retained in place by the bolts 72, and which fits closely about the plug extension 42 at a point 74. Within the collar there are provided suitable packings 75 and plates 76 and a spring 77 to retain the plates and packings in position.

At 80 there is shown a lubricating fitting, connecting with a channel 81 by which the pilot valve and the working parts thereof can be lubricated. Any lubricant forced through the pilot valve will be retained within the collar 73, further lubricating the valve stem, and not be permitted to enter the casing.

What I claim and desire to secure by Letters Patent is:

A pilot valve comprising a housing closed at one end and having an elongated slit in the other end, a shaft rotatably mounted in said housing having an arm mounted thereon, said arm extending through the slit in the end of the housing and having a float on one end and a gear on the other end, a second shaft having a gear rotatable therewith and meshing with the first mentioned gear, a valve plug mounted in a socket in the side wall of the housing and keyed to an extension on the second shaft so as to be rotated by movement of said second shaft, said plug having a transverse port therethrough which aligns with ports in the housing upon movement of the float member.

JEAN EARL CHRISTIAN.